United States Patent [19]

Daester et al.

[11] 3,822,866
[45] July 9, 1974

[54] FEEDING, WEIGHING AND MIXING APPARATUS

[75] Inventors: Henri H. Daester, Bottmingen near Basle; Alfred Jüngling, Muttenz near Basle, both of Switzerland

[73] Assignee: Daester-Fairtec AG, Basle, Switzerland

[22] Filed: Sept. 12, 1972

[21] Appl. No.: 288,342

[30] Foreign Application Priority Data
Sept. 15, 1971  Switzerland................. 13518/71

[52] U.S. Cl. ............................................. 259/149
[51] Int. Cl. ............................................. B28c 7/04
[58] Field of Search .......... 259/154, 22, 149, 23, 24

[56] References Cited
UNITED STATES PATENTS

| | | | |
|---|---|---|---|
| 2,285,765 | 6/1942 | Carswell | 259/154 |
| 2,877,524 | 3/1959 | Bishop | 259/154 |
| 2,946,574 | 7/1960 | Munderich | 259/154 |
| 3,110,421 | 11/1963 | Matthias | 259/154 |

*Primary Examiner*—Robert W. Jenkins
*Attorney, Agent, or Firm*—Wenderoth, Lind & Ponack

[57] ABSTRACT

An apparatus for feeding, weigh proportioning and mixing a first flowable material with other likewise flowable or liquid or paste-like material, characterised by hopper equipment containing one or more separate chambers for separately storing said first flowable material, a stabilizing zone for said first flowable material in each of said hopper chambers, a first gating means at the bottom of each of said stabilizing zones, at least one first weighing means comprising a first weigh hopper, a first discharging device and a motion transmitting means, one or more storage hoppers for said other flowable or liquid or paste-like material, each associated with a second gating means, a second weighing device comprising a second weigh hopper, a closure fitted to said second weigh hopper and a second motion transmitting means, a second discharging device and a mixer, the arrangement being such that at least part of the charging opening of said first weigh hopper is in the direction of fall below its associated first gating means, that at least part of the charging opening of said second weigh hopper is in the direction of fall below the discharging means of the associated first weigh hopper and that the second discharging means is in the direction of fall below said closure of the second weigh hopper and provides communication in said direction of fall with said mixer. A method of operating the apparatus is also described.

10 Claims, 5 Drawing Figures

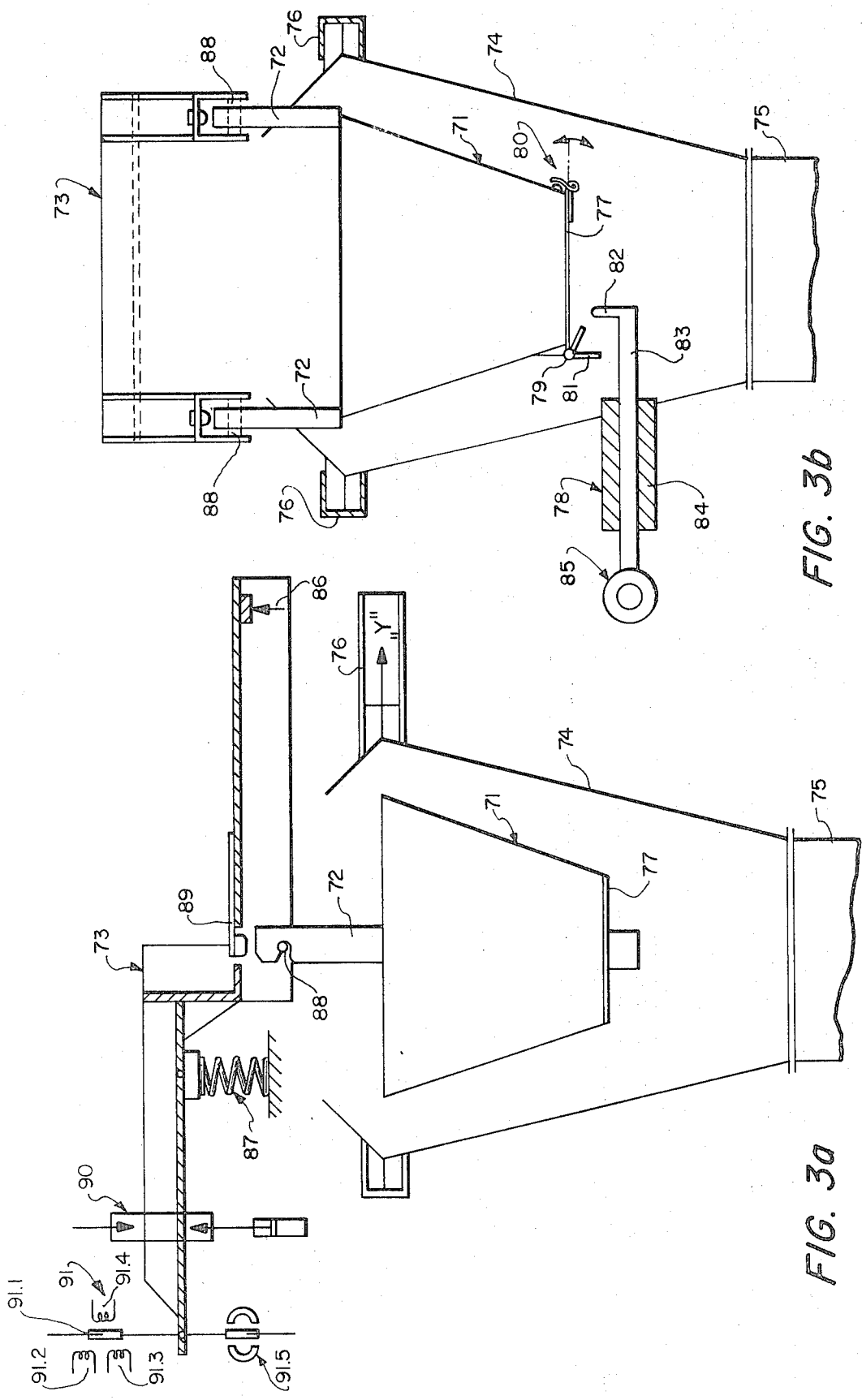

FEEDING, WEIGHING AND MIXING APPARATUS

BACKGROUND OF THE INVENTION

In the synthetic plastics processing industries it has been found that the apparatus used for proportioning raw materials and additives by reference to volume are not sufficiently accurate and do not give sufficiently consistent results to satisfy modern requirements. When such apparatus is used the qualitative uniformity of the product depends upon the performance of adjusting and weighing procedures which take up much time, and which must be carried out whenever the same or changed mixture proportions are to be preadjusted.

On the other hand, feeding by reference to weight, which does satisfy requirements with respect of precision and reproducibility, has hitherto been introduced only in certain limited areas. The method has been confined to weight feeding by belt type weight feeders, tilting and bagging scales. However, since the feeding of materials to, for instance, plastics processing machines comprises three stages — feeding, proportioning and mixing — expensive accessory equipment is needed for conveying and mixing. The high investment cost of such equipment improves the accuracy of the metering process but it does not provide the desired full labour-saving automation.

It is an object of the present invention to provide apparatus for feeding, proportioning by reference to weight and mixing a first flowable material with other flowable or liquid or pastelike materials in a fully automatic process which permits very fine tolerances with regard to the component weights and the total weights to be observed.

SUMMARY OF THE INVENTION

The proposed apparatus is characterised by hopper equipment containing one or more separate chambers for separately storing said first flowable material, a stabilizing zone for said first flowable material in each of said hopper chambers, a first gating device at the bottom of each of the stabilizing zones, at least one first weighing means comprising a first weigh hopper, a first discharging device and a first motion transmitting means, one or more storage hoppers for the other flowable or liquid or paste-like materials, each associated with a second gating means, a second weighing device comprising a second weight hopper, a closure fitted to said weigh hopper and a second motion transmitting means, a second discharging device and a mixer, the arrangement being such that at least part of the charging opening of the first weigh hopper is in the direction of fall below its associated first gating means, that at least part of the charging opening of the second weigh hopper is in the direction of fall below the discharging means of the associated first weigh hopper and that the second discharging means is in the direction of fall below the closure of the second weigh hopper and provides communication in said direction of fall with the mixer. Conveniently the hopper chambers may be connected by filling pipes controlled by first valves to storage hoppers. It is also advantageous to connect the hopper chambers to a source of vacuum by evacuating pipes which are controlled by second valves, and which serve for refilling the hopper chambers with material from the storage hoppers and end in the upper part of the chambers, each hopper chamber containing a filter below the entry of said evacuating pipe to prevent any of the flowable material entering the hopper through the filling pipes from being drawn off by the vacuum.

The proposed method of operating the above defined apparatus comprises filling the hopper chambers to a prescribed level from the storage hoppers, upon reaching the prescribed level in one of the chambers cutting off the corresponding supply of material and by actuation of the associated gating device by weight metering a first quantity of flowable material into the first weigh hopper, at the end of this first metering process and on the assumption that the prescribed filling level has meanwhile been attained in a second chamber, stopping the further supply of material to this latter chamber and by weight metering a second quantity of flowable material into the first weigh hopper by the actuation of another of the first metering devices, the metering processes being continued until all the first components of material have been weighed into the first weigh hopper, and substantially simultaneously with the start of the first weighing in the first weigh hopper by weight metering the first quantity of material by the first of the second gating devices into the second weigh hopper, at the end of the first introduction of material into the second weigh hopper feeding a further quantity of material into the second weight hopper by the actuation of another of the second metering devices, such metering operations being continued until all the second components of material have been weighed into the second weigh hopper, at the end of the final metering process arresting the scale beams of the respective weigh hoppers, in succession opening the closures of the second discharging means of the second weigh hopper and of the first weigh hopper, so that first the major proportion of the second material contained in the second weigh hopper falls downwards, followed by the descent of the first material contained in the first weigh hopper through the first discharge means into the second weigh hopper from which it sweeps out residual second material, both portions of material entering the mixer, and finally operating the mixer for a given period of time.

DESCRIPTION OF THE DRAWINGS

For a better understanding of this invention, reference may be had to the accompanying drawings, in which:

FIGS. 3a and 3b are a side view and an end view, respectively, of an embodiment of the second weigh hopper including a schematic representation of the deflection detector and of the closure means of the second weigh hopper.

DETAILED DESCRIPTION OF THE INVENTION

Figure 1:
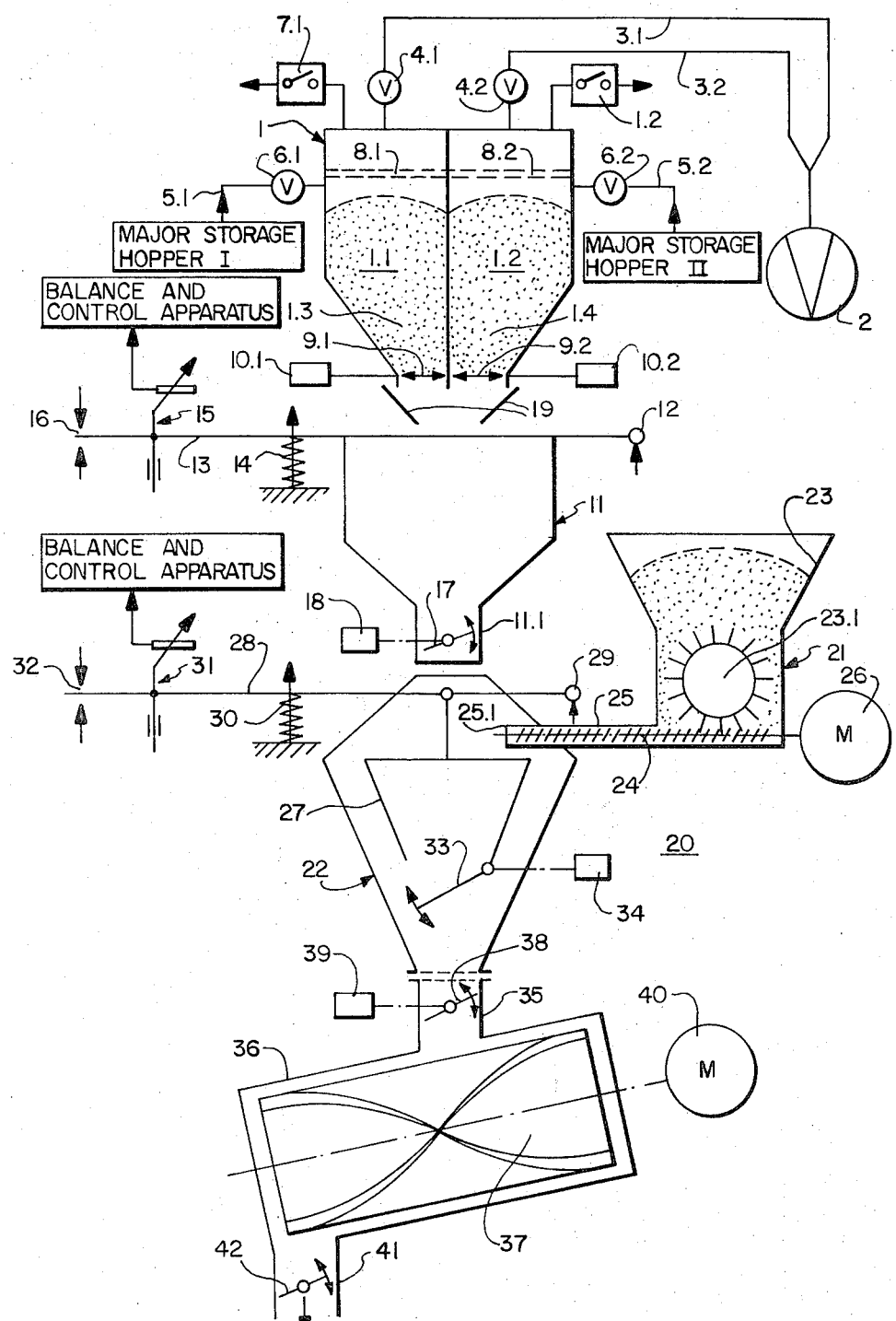
FIG. 1 is a schematic side view of an embodiment of apparatus according to the invention.

The apparatus shown in FIG. 1 comprises a hopper 1 containing two hopper chambers 1.1 and 1.2. The hopper 1 is associated with evacuating means 2 connected to the hopper chambers 1.1 and 1.2 by pipes 3.1 and 3.2 each controlled by a remotely operable valve 4.1 and 4.2. Filling pipes 5.1 and 5.2 each incorporating a valve 6.1 and 6.2, respectively, discharge into the hopper chambers and provide connections to raw material storage bunkers (not shown). It will be understood that these hopper chambers may also simply constitute the final compartments of major storage hoppers I and II from which principally granulated or pulverulent materials can be drawn. Stabilizing zones 1.3 and 1.4 shown in the illustrated embodiment and intended to insure a precisely controlled metering effect are naturally of considerable importance in such a case.

Each hopper chamber is fitted with a filling level indicator 7.1 and 7.2, and each hopper chamber in its upper part also contains a filter 8.1 and 8.2 which is located slightly above the entry openings of the filling pipes 5.1 and 5.2 in the chamber, and which prevents material entering the hopper from being drawn out through the pipes 3.1 and 3.2 into the vacuum equipment 2. At the bottom end of each hopper chamber, i.e., below the stabilizing zones 1.3 and 1.4, are gating devices 9.1 and 9.2 which are operable by remote-controlled drive means 10.1 and 10.2.

It will be readily understood that the hopper 1 may comprise more than two chambers, and that each chamber will then naturally be connected to and associated with the necessary accessory equipment. The evacuating equipment 2 may be a by-pass compressor, a compressed air ejector or a vacuum pump. A separate vacuum set may be associated with each hopper. The filling level indicators 7.1 and 7.2 may be manostats or vacustats since the air stream is ruptured when the hopper chambers are full and the pressures are subject to a brief transient change, sufficient for the operation of a switch in the manostat. However, as an alternative, photoelectric detectors or approach type switches or inductively or capacitively working detector heads could be used, the latter more particularly in cases in which the filling level is to be monitored continuously.

The filters 8.1 and 8.2 may be corrugated filter plates or filter cartridges. They may advantageous be arranged to be cleaned by a reversed air stream generated either by a separate compressed air source (not shown) or by a reversible vacuum-pressure set (not shown). The cleaning of the filters may alternatively be effected by vibration, rapping or brushing. The gating devices at the bottom end of the hopper chambers preferably have the form of slides as will be later described in greater detail with reference to FIGS. 2a and 2b.

Below the outlet end of the hopper chambers there is provided a first weigh hopper 11 in which the material leaving the hopper chambers is weighed. The weigh hopper 11 depends from a scale beam 13 which is mounted to pivot on a fulcrum at 12, and which is supported by an adjustable spring 14. Attached to the scale beam is the movable member of a deflection detector 15 which transmits a signal proportional to the deflection, i.e. to the weight, to a weighing controller (not shown). The weighing scale can be zeroed and adjusted for instance by varying the bias of the spring 14, whose deflection is a measure of the amplitude of the weight-reporting signal, in relation to the deflection detector. The required weights can be preselected on, for instance, digital counters in the controller, calibrated in units or percentages of the weight of the entire batch that is to be weighed. Preselection may be manual or it may be automatically performed by punched cards.

In FIG. 1 the deflection detector 15 is schematically represented by a movable potentiometer. However, it will be understood that any other device which generates signals proportional to the magnitude of a movement would serve the same purpose. Furthermore, arresting means 16 are provided for the scale beam. As illustrated in FIG. 3a at 90 this may be associated with an oscillation damping device. The bottom end of the weigh hopper 11 is provided with an outlet 11.1 containing a closure 17 in the form of a flap valve or some other equivalent means operable by an actuator 18. In order to insure that the materials which are metered from the hopper chambers 1.1 and 1.2 drop into the weigh hopper in approximately even distribution, deflector plates 19 are provided which between them define the cone of discharge. In cases in which there is a larger number of hopper chambers or major quantities of material must be very precisely weighed, several weigh hoppers 11 may be provided, each associated with a scale beam of its own and preferably also with separate measuring equipment. Other details concerning the weigh hopper will be understood from the later description of the manner in which the entire system functions.

The bottom end of the outlet 11.1 adjoins a proportioning system 20 which consists of a plurality of proportioning feeders 21 preferably for the introduction of pulverulent feeds (colour pigments) as well as of granular and possibly liquid or pastelike materials, and of a second weigh hopper contained in a casing 22. Only one of the feeders 21, which may be of like or different construction according to the nature of the fed material, is shown in FIG. 1 and this is designed for proportioning and feeding a pulverulent or granular material. In a general way, it comprises a charging hopper 23, a paddle wheel 23.1 for loosening the pulverulent or granular feed inside the hopper 23, and a screw feeder 24 which is fed by the paddle wheel 23.1 with the said feed. The screw feeder 24 is rotatably mounted in a metering tube 25 and driven by a motor 26. The level of the material still stored in the hopper 23 is preferably monitored by a detector (not shown), said detector triggering an alarm when the hopper needs to be refilled and starting a conveyor means (not shown) for automatically replenishing the contents of the hopper. For the purpose of optimal metering precision the speed of the motor 26 can be controlled.

The metering tube 25 extends through the wall of the casing 22 into the range of a second micro-weigh hopper 27 which forms part of the second proportioning system and which is suspended from a scale beam 28. In order to improve the proportioning accuracy to an optimum, the open end of the metering tube 25 is provided with an inserted ring 25.1. This has a back pressure generating effect and prevents dribble. If a very high degree of metering accuracy is not required or the provision of a screw feeder is inadvisable other metering devices may also be used. Liquid and paste-like feeds are conveniently metered by pinch tube, reciprocating or rotary piston or diaphragm pumps.

The scale beam 28 can tilt about a fulcrum 29 and is supported by an adjustable spring 30. As in the case of the scale beam 13, the movable part of a deflection detector 31 is attached to the scale beam 28 for generating a signal that is proportional to the deflection and hence to the weight and for transmitting the signal to a weighing controller (not shown). The deflection detector 31 is of the same type as that shown at 15, but it could be of some other design. With reference to the calibration of the scale, the same principles apply as to the weighing equipment associated with the scale beam 13. Moreover, arresting means 32 for the scale beam 27 are provided and may likewise be of the same form of construction as the arresting means 16.

If the number of feeders provided is so large that the provision of a single micro-weigh hopper 27 would be impracticable, or if materials in different aggregate states (solid and liquid substances) must be weighted or larger volumes are required to be weighed with great accuracy, then several weigh hoppers 27 may be provided, all of them depending from the same scale beam or each suspended from a separate scale beam. Alternatively, it is, naturally, possible to introduce some or all the materials that are to be metered in by feed means 21 directly into the weigh hopper 11. This is a procedure which may be convenient for liquids. In view of the usual difference between the different weights a weighing range changeover switch may be required for carrying out all the weighings with the desired degree of precision.

The micro-weigh hopper 27 is fitted at its bottom end with a closure 33 in the form of a flap operable by an actuating device schematically indicated at 34. An embodiment of such an actuating device is illustrated in detail in FIG. 3b. In order to facilitate cleaning the micro-weigh hopper, the casing 22 is conveniently arranged so that it can be removed. At the bottom end of the casing 22 is an outlet tube 35 which may be connected to the casing 36 of a mixer 37. This outlet tube 35 contains a closure, for instance, in the form of a butterfly valve 38 operable by a drive means 39. This serves for separating the above described weigh proportioning device from the mixer casing 36.

The mixer 37 is an inclined drum type mixer driven by a motor 40 at a speed which may be determined according to the materials that are to be mixed by reference to a special materials code. For this purpose the motor is associated with a controller (not shown) which permits the speed of revolution of the mixer drum as well as possibly the mixing time to be controlled. It will be understood that other mixer types would also be serviceable. The mixer may incidentally be equipped with heating and/or cooling means. The mixer exit has the form of a stub pipe 41 containing a butterfly valve 42. This pipe may be directly connected for instance to a production machine (not shown).

Figure 2A:
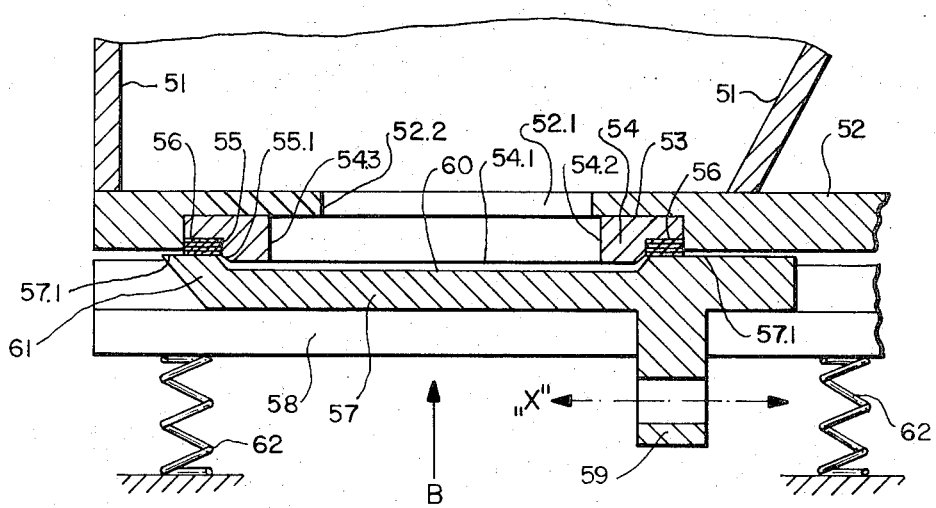
FIGS. 2a and 2b are a sectional side view and a plan, respectively, of a sliding gate for feeding granular materials.
Figure 2B:
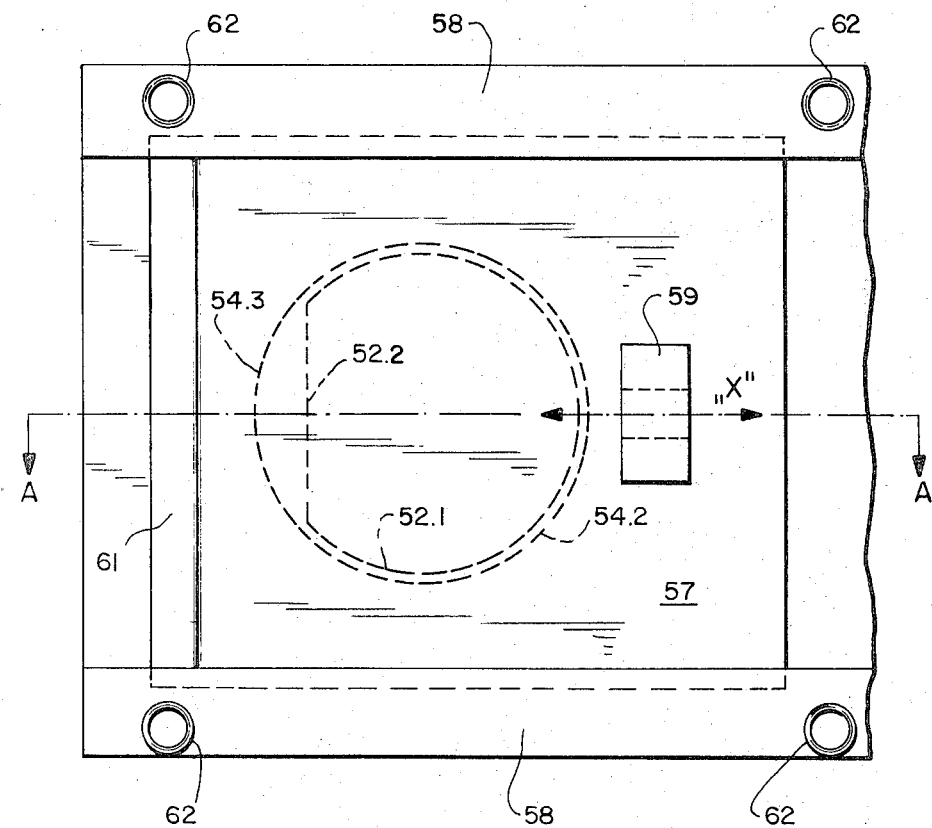

FIGS. 2a and 2b show structural details of a preferred form of construction of one of the gating devices 9.1 and 9.2 in FIG. 1, FIG. 2a being a section taken on the line A—A in FIG. 2b which is an elevational section in the direction B in FIG. 2a. The numeral 51 designates wall portions of the hopper 1 (FIG. 1) which are attached to a mounting plate 52. The mounting plate 52 contains an opening 52.1 of a shape that will be later described, and a recess 53 in its underside for the reception of a fitted ring 54 which is centred and retained inside said recess 53. The fitted ring 54 is provided with a peripheral machined recess 55 which together with a portion of the wall of the recess 53 in the mounting plate 52 forms a slot for the reception of a sealing ring 56. The height of the fitted ring is so chosen that its underside 54.1 stands proud of the underside of the mounting plate 52. The reason for this will be later described.

Slidably mounted underneath the mounting plate 52 is a slide 57 which is movable in slideways 58 in the directions indicated by the double-headed arrow "X." The slide 57 is shown in FIGS. 2a and 2b in that position in which it covers the opening 52.1 in the fitted ring 54. The actuating means for moving the slide 57 are connected to a lug 59 but are not shown to avoid complicating the drawing. In the region of the fitted ring 54 which projects beyond the plane of the underside of the mounting plate the slide is formed with a recess 60 having sloping sides extending roughly parallel to the likewise bevel cut peripheral edge 55.1 adjacent the machined recess in the ring 54. The ramp 61 thus formed rearwardly has the form of a knife edge. The slideways 58 are resiliently supported by springs 62 and insure that the slide 57 bears cleanly and tightly against the fitted ring 54 and more particularly the sealing ring 56.

When the slide 57 is displaced by its actuating means (not shown) from its position of rest, i.e., out of its closing position, in the arrowed direction marked "X" to the right, the sloping sidewall of the recess 60 will first ride up the peripheral bevel edge 55.1, causing the sealing face 57.1 of the slide to lift off the sealing ring 56 and then to ride on the underside 54.1 of the ring 54. In the course of the further displacement of the slide to the right the sealing face 57.1 slides along the underside 54.1 of the ring, the springs 62 insuring the maintenance of tight contact. As soon as the desired quantity of material has been discharged through the openings 52.1 and 54.2, the slide is reclosed. It now moves to the left and the knife edge of the ramp 61 "cuts off" the further discharge of material. Owing to the special configuration of the opening 52.1, shown in chain lines in FIG. 2b, the cross section of flow ends abruptly at a straight side of the opening at 52.2. When the ramp edge which is substantially parallel to this side 52.2 of the opening is level with this bounding line, a few residual particles of material may still fall through until the ramp edge 61 reaches the wall 54.3 of the opening of the fitted ring 54. Any particles which may have dropped in front of the knife edge immediately before the opening 54.2 is closed will be cut. When the sealing face 57.1 has traversed the underside 54.1 of the fitted ring, the slide rides down the ramp 55.1 and its sealing face 57.1 moves into contact with the sealing ring 56 where it remains. This sliding gate is designed to achieve a rapid and reliable cut-off and ensures that the material is metered out of the hopper chamber very precisely.

In cases in which rapid and accurate metering by weight is not needed the gating slide shown in FIGS. 2a and 2b could be replaced by a rotary disc valve or a valve of the pinch tube type.

FIGS. 3a and 3b are schematic side and end views, respectively, of the micro-weigh hopper. In these Figures the numeral 71 generally designates the weigh hopper which is suspended by means of hangers 72 from a scale beam generally designated by the numeral 73. The weigh hopper 71 is contained inside a casing 74 which aligns with an outlet tube (35 in FIG. 1) underneath. To give ready access to the weigh hopper 71, the casing 74 is suspended between guide rails 76 by which it can be withdrawn in the arrowed direction "Y" (FIG. 3a) to the right. FIG. 3b schematically shows an example of a flap closure 77 and part of the associated actuator which is marked 78. The flap and its actuator are so designed that they engage only when the flap is being opened and closed, so that the weighing cannot be affected in any way. For this purpose the flap 77 is hingeably attached to the hopper at 79, whereas its opposite side is held in closing position by a snap action catch 80 in a manner not shown in detail. The hinged side of the flap 77 is fitted with entraining means 81 which likewise is not shown in detail, but which cooperates with a driving finger 82 on a rod 83. The rod 83 is adapted to be slidably pushed to and fro in a tubular bush 84 and at 85 it is provided with means for coupling to an actuator, likewise not shown in the drawing.

The scale beam 73 tiltably rests at one end on a support 86 only schematically indicated in FIG. 3a and understood to be affixed to a supporting frame which also carries the other components of the equipment. At the same time the beam is held in equilibrium by an adjustable spring 87 which corresponds to the spring marked 30 in FIG. 1, and which is likewise mounted on the frame. The suspension elements of the micro-weigh hopper movably hang on a pin 88 on the scale beam and they are prevented from being accidentally disengaged by a retaining spring element 89.

The scale beam 73, which for stability reasons has the form of a twin beam at least in the region between its fulcrum 86 and the suspension pin 88, is retainable by a schematically indicated remotely controllable arresting device 90 during the periods intervening between consecutive weighings. This arresting means corresponds to the device marked 32 in FIG. 1. At the left-hand end of the scale beam a deflection detector 91 is provided which is based on a working principle that differs from that of the deflection detector 31 in FIG. 1; this generates a signal modulated by a variable inductance. Coils 91.2 to 91.4 located on each side of a magnetic core 91.1 are connected to the measuring and controlling electronic system (not shown) of the overall equipment. The purpose and functions of this system will be understood from the following description. The deflection detector 91 is provided with damping means 91.5 illustrated to have the form of a magnetic damping system.

The above described equipment for feeding, weigh proportioning and mixing different flowable feeds is designed to operable in association with a continuously working machine using the mixed materials. Although naturally the apparatus does not itself work continuously its working speed is preferably controlled by a controller (not here described) according to the quantitative rate of throughput of the processing machine. The following description of the manner the apparatus functions omits a discussion of the timing factors which arise from this association and is exclusively concerned with the functional purposes of the several components.

For the purpose of filling the hopper chambers 1.1 and 1.2 the evacuating equipment 2 (or any other conveying means) is started up when the materials in the chambers have dropped to a prescribed minimum level and the associated valves 4.1, 6.1 and/or 4.2, 6.2 are opened. Consequently fresh material is fed into the associated hopper chamber from the respective storage hoppers I and/or II by means of an air current or in some other way. The length of time for which each of the hopper chambers is connected to the evacuating equipment is preferably monitored to insure that if any one of the chambers should leak the fault is at once discovered. In principle the level of the material in each of the chambers 1.1 and 1.2 is raised to its maximum before each proportioning process. As soon as the filling level indicator 7.1, 7.2 of one of the hopper chambers reports that the required level has been reached the associated valves 4.1, 6.1 and respectively 4.2, 6.2 are reclosed. When both level indicators 7.1, 7.2 report "level high" the evacuating equipment is stopped. Since material or fines entering during the filling of the chambers 1.1 and 1.2 have been drawn up to the filters 8.1 and 8.2 a separate arrangement (not shown) is adapted to send an air current in the opposite direction through the filters for the purpose of cleaning the same. If an evacuating set 2 is provided that can be optionally operated to generate a vacuum or gauge pressure, then the cleaning process can be performed by simply reversing the direction of operation of the evacuating set, and by appropriately controlling the valves 4.1, 4.2 and possibly the valves 6.1, 6.2. It may be noted that the signal "level high" will appear when the level of the material has risen to about 6 to 8 cms below the underside of the filters.

As soon as the first "level high" signal appears and, possibly, the corresponding filter has been cleaned, a given quantity of material is metered from the full hopper chamber into the first weigh hopper 11. For this purpose the gating device (i.e., the slide 57 in FIG. 2) is opened until the deflection detector 15 indicates that the desired quantity of the feeding component has been received in weigh hopper 11. The actual result of the weighing of the first portion of material is transmitted to the controller. It should be observed that the cleaning of the filter may be effected at some other time rather than directly after the filling of the material into the hopper chambers, but this process must not be allowed to interfere with the metering process. All the filters may be cleaned simultaneously or in direct succession.

When the first component of feed has been weighed and the second hopper chamber has been filled, the associated gating device is actuated and the second component of feed discharged into the weigh hopper 11. The quantity of this second material may either be fixed or it may be varied according to the actual measured weight of the first component of feed. The individual weight of the second component and the total of both weighings can be stored in a storage unit of the controller. It will be understood from these explanations that the feed components that are consecutively discharged from the hopper chambers are not passed on individually but retained in the first weigh hopper 11 until this is discharged in its entirety. If more than two hopper chambers are provided the same considerations apply to the following metering processes as to the described second metering process. As already mentioned the gates 9.1 and 9.2 are slides which cause substantially no delay and thus achieve an optimum degree of accuracy. In this context it may be added that, owing to the free fall of the material from the hopper chambers 1.1 and 1.2, the weighing in the first weigh hopper 11 will be modified by the momentum of the falling material so that the indicated weight exceeds that subsequently measured under steady conditions. However, since the functioning of the slide 58 (FIG. 2a) is itself not free from inertial effects, some additional material will still fall out of the hopper chamber after the slide has been actuated in response to the measurement of weight by the deflection detector 15. It is found that this roughly compensates the measuring error caused by the momentum of the falling material. Naturally it would also be possible to reduce the momentum by an appropriate configuration of the deflectors 19 which in principle determine the feeding cone into the weigh hopper 11.

At the same time as the raw materials are being weighed in the first weigh hopper 11 the materials loaded into the microweigh hopper 27 are also weighed. These materials, which may be pigments or like additives, are present in storage hoppers comprised in separate feed means 21 for each additional material. In this second weighing stage the different components are preferably likewise weighed consecutively as in the first metering stage. This again permits the individual and total weighing results to be stored in a signal processing unit of the controller and subsequent weighings, if necessary, to be corrected by appropriate adjustment of reference quantities. The components that are to be added in the second weighing stage may be introduced according to fixed reference values or they may be determined according to the weighings of the material components and/or the weighed totals of the first stage. The sequence in which the components are introduced into the micro-weigh hopper depends upon a given programme fed into the control system which accordingly starts and stops the driving motors 26 of the several feeding devices. The time they remain in operation depends upon the desired weight of the component they feed and is controlled by the deflection detector 31. In order to ensure maximum metering accuracy the coaxial screw feeders 24 are provided which together with the inserted gating ring 25 provide a feed rate of outstanding uniformity. Moreover, the feed screw 24 is preferably driven by a continuously speed-controlled motor M.

As soon as the components that are to be weighed in the micro-weigh hopper 27 are complete and the scale beams 13 and 28 of both weigh hoppers have been arrested by the arresting devices 16 and 32, the butterfly disc 38 in the outlet 35 above the mixer 36 is opened first, then the flap closure 33 of the micro-weigh hopper 27 and in quick succession thereto the butterfly disc 17 in the outlet of the upper weigh hopper 11. The normally fairly large quantity of material leaving the weigh hopper 11 falls through the micro-weigh hopper and sweeps the entire weighed components which the latter contains substantially without leaving anything behind into the mixer. This insures that the micro-weight hopper 22 is always completely clean. This is a matter of importance since even small residues of material may upset the metered proportions.

After the above described discharge of the two weigh hoppers the flaps 35, 33 and 17 are reclosed, the scale beams 13 and 27 are released and their zero positions automatically corrected. The apparatus is thus ready to proportion a fresh batch.

What is claimed is:

1. Apparatus for feeding, weight proportioning and mixing a first flowable material with a second likewise flowably material comprising:
   a first storage hopper containing at least one separate chamber for separately storing said first flowable material, a stabilizing zone for said first flowably material in the bottom region of each of said hopper chambers;
   a first gating means at the bottom of each of said stabilizing zones;
   at least one first movable weighing means comprised of a first weight hopper, a first discharging device positioned within said first weight hopper, and a first motion transmitting means operatively connected for transmitting movement of the weight hopper to a first weighing and control device;
   at least one storage hopper for said second flowable material, a second gating means operatively positioned in each of said storage hoppers for said second material; a second movable weighing device comprised of a second movable weight hopper positioned directly below said first weight hopper, a closure fitted to the base of said second weight hopper, and a second motion transmitting means for transmitting the movement of said second weight hopper to a second weighing and control device;
   a second discharging device located at the lower end of said second storage hopper for said second flowable material; and
   a mixer positioned below said second movable weight hopper, said closure on said second weight hopper being adapted to open only when said second discharge device is open and said first discharge device opening only when said second discharge device and said closure are open, and said first weight hopper communicating with said mixer through said second weight hopper.

2. Apparatus according to claim 1 further comprising deflector plate means arranged to guide material discharged through said first gating means to a given point in said first weigh hopper below.

3. Apparatus according to claim 1, in which said second gating means comprises a screw conveyor and a variable speed motor coupled thereto.

4. Apparatus according to claim 1, in which said closure is connected to the bottom of said second weigh hopper and consists of a flap hingeably attached at one end to said second weigh hopper, and in which entraining means is provided at the hinged end of said flap for cooperation with an actuating finger of a flap operating means to convey said flap into and out of closing position, the other end of said flap being fitted with a snap action catch which engages the outside of the second weigh hopper when said flap is closed.

5. Apparatus according to claim 1, in which said first gating means comprises a slide shutoff member having a slide portion and displaceably mounted relative to a plate having an outlet opening and an edge which is parallel to the leading edge of said slide portion, said first gating means thus having rapid shut off characteristics.

6. The device of claim 1, further comprising a spring operatively connected to said first hopper motion transmitting means for holding said means in balance, said spring being adjustable depending on a reference weight, selectively activated locking means and a measuring sensor both operatively coupled to said first motion transmitting means, said measuring sensor producing a signal dependent on its distance of travel.

7. The device of claim 1, further comprising a spring operatively connected to said seconnd hopper motion transmitting means for holding said means in balance, said spring being adjustable depending on a reference weight, selectively activated locking means and a measuring sensor, both operatively coupled to said second motion transmitting means, said measuring sensor producing a signal dependent on its distance of travel.

8. A method of operating an apparatus for feeding, weight proportioning and mixing a first flowable material and a second flowable material which includes a first storage hopper containing at least one separate chamber for separately storing a first flowable material, a stabilizing zone for said first flowable material in the bottom region of said storage hopper chambers, a first gating means at the bottom of each of said stabilizing zones, at least one first movable weighing means comprising a first weight hopper, a first discharging device positioned within said first weight hopper, and a first motion transmitting means for transmitting movement of said first weight hopper to a first weighing and controlling device, at least one additional storage hopper for said second flowable material, a second gating means operatively positioned within each of said at least one additional storage hoppers for said second flowable material, a second weighing device comprised of a second movable weight hopper and positioned directly below said first movable weight hopper, a closure fitted to the base of said second weight hopper, and a second motion transmitting means for transmitting the movement of said second movable weight hopper to a second weighing and control device, a second discharging device located at the lower end of said second storage hopper, and a mixer; said method comprising the steps of:

filling each of said first storage hopper chambers with a first flowable material to a prescribed level from a supply source;

feeding a weight-metered amount of a first quantity of said first flowable material from a first of said chambers of said first storage hopper by actuation of the associated one of said first gating means to said at least one first movable weighing means;

subsequently sequentially feeding a weight-metered amount of said first quantity of said first flowable material from others of said chamber of said first storage hopper by actuation of another of said first gating means to said at least one movable weighing means;

feeding, simultaneously with the feeding of said first flowable material from said first storage hopper, a weight-metered amount of said second flowable material into said second weight hopper by means of one of said second gating means from said at least one storage hopper for said second flowable material;

subsequently feeding a further weight-metered amount of said second flowable material into said second weight hopper by the actuation of another of said second gating means from another of said at least one storage hoppers for said second flowable material;

opening, in succession, said second discharging device, said closure of said second weight hopper and said discharging device of said first weight hopper, whereby first the major proportion of the second material contained in said second weight hopper falls downward followed by the descent of the first material contained on said first weight hopper through said first weight hopper through said first discharge means into said second weight hopper from which it sweeps out residual second material, both portions of material entering said mixer; and operating said mixer for a given period of time.

9. The method of claim 8, further comprising the steps of storing an electrical signal which is indicative of the weight of said first quantity of said first flowable material metered into said first weight hopper in said first weighing and controlling device and determining automatically the desired weights of the subsequent sequentially fed quantities of materials metered into said first weight hopper by reference to said stored electrical signal.

10. A method according to claim 8, in which one or more or all of the quantities of material that are to be metered by said second gating means into said second weight hopper are introduced into said second weigh hopper in dependence upon one or several or all of the first material components metered into said first weight hopper.

* * * * *